July 20, 1926.
H. M. PFLAGER
1,593,465
LOCOMOTIVE TRAILER TRUCK
Filed Sept. 14, 1925    2 Sheets-Sheet 1
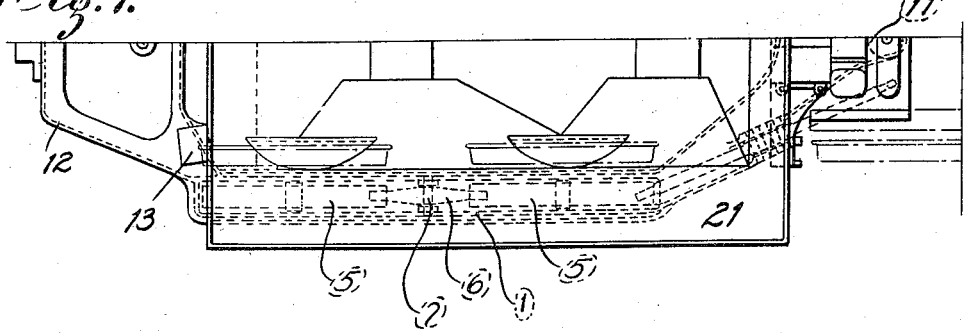
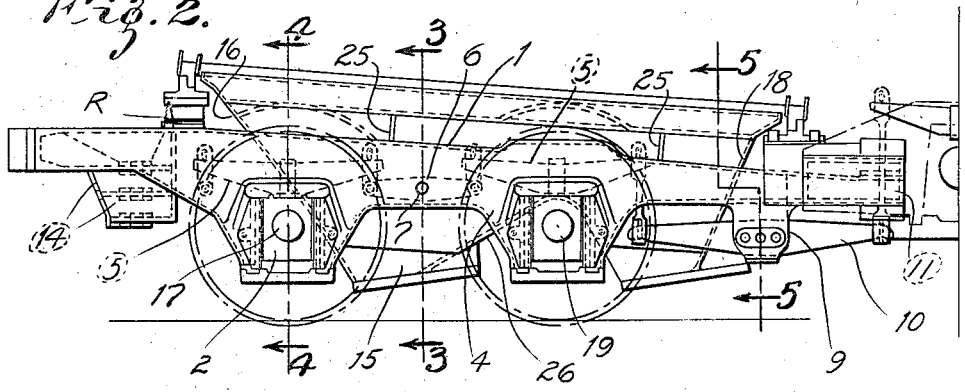
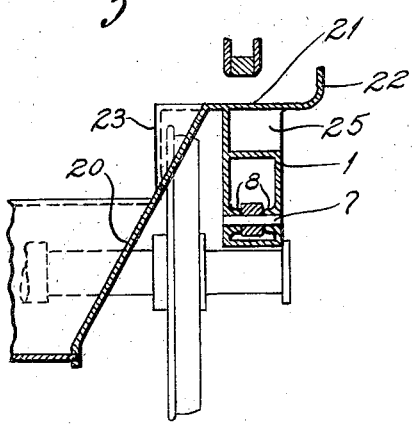 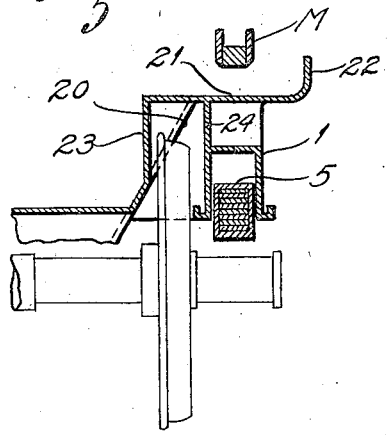
INVENTOR:
HARRY M. PFLAGER.
BY Cornwall, Bedell & James
ATTORNEYS.

July 20, 1926.

H. M. PFLAGER 1,593,465

LOCOMOTIVE TRAILER TRUCK

Filed Sept. 14, 1925

INVENTOR:
HARRY M. PFLAGER.
By Cornwall, Bedell & James,
ATTORNEYS

Patented July 20, 1926.

1,593,465

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF MISSOURI.

LOCOMOTIVE TRAILER TRUCK.

Application filed September 14, 1925. Serial No. 56,215.

My invention relates to railway rolling stock and consists in an improved trailer truck for use in locomotives.

The object of my invention is to provide a truck frame and ash pan structure in which the ash pan forming elements are also parts of the truck frame or serve to brace and reinforce the same and conversely in which the truck frame elements are parts of and serve to brace and reinforce the ash pan. Preferably, the ash pan and truck frame are formed in an integral one-piece casting.

In the accompanying drawings which illustrate my invention—

Figure 1 is a top view of one longitudinal half of a four wheel trailer truck embodying my invention.

Figure 2 is a side elevation of the same.

Figure 5:
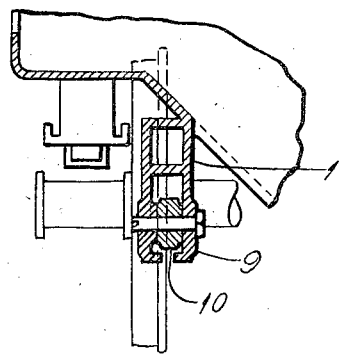

Figures 3, 4 and 5 are vertical transverse sections taken on lines 3—3, 4—4, and 5—5, respectively, of Figure 2.

Figure 6:
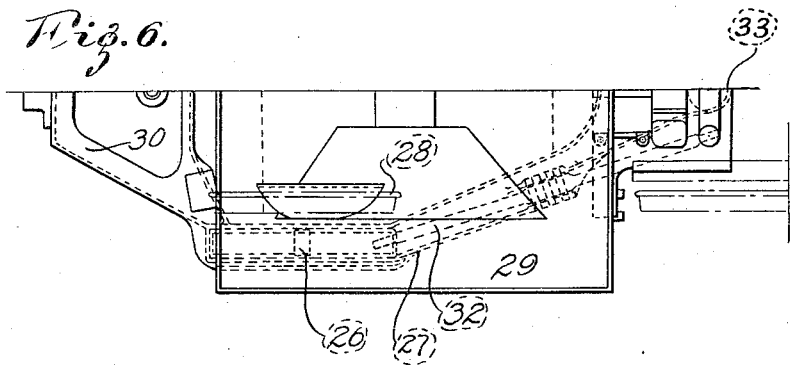

Figure 6 is a top view of one longitudinal half of a two wheel trailer truck embodying my invention.

Figure 7:
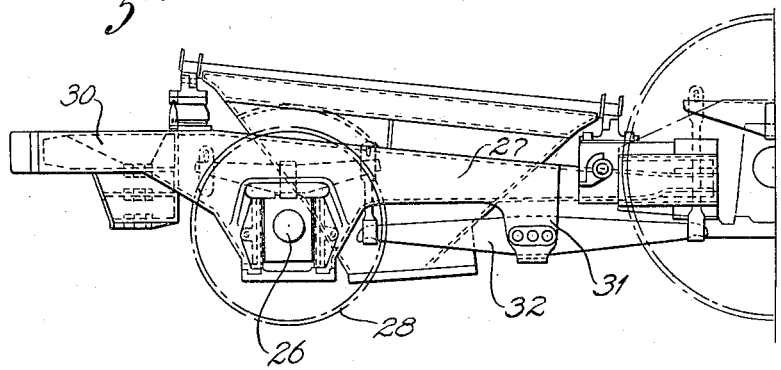

Figure 7 is a side elevation of the same.

The truck frame illustrated in Figures 1 to 5 inclusive includes wheel pieces 1 shown as being of inverted U-shape over the journal boxes 2 and as being box-shape between the pedestal portions 4 and beyond the same. Each wheel piece 1 serves as a housing for the truck springs 5 and for an equalizer 6 which is fulcrumed upon pin 7 having bearings 8 formed integrally with the side walls of the wheel piece. The main portion of the wheel piece has depending brackets 9 which form fulcrum bearings for an equalizer 10 connecting the truck spring system with the locomotive spring system as indicated at the righthand of Figure 2.

The forward portion of each wheel piece 1 extends inwardly toward the longitudinal center line of the truck and is united with the opposite wheel piece to form a center plate 11 through which the truck is connected to the locomotive frame. The rear ends of the wheel pieces are connected by a cross member 12 which is provided with supporting surfaces 13 for the fire box rocker bearings R and with a draw-bar pocket or pockets 14.

The draft and buffing stresses incident to the operation of the locomotive are transmitted from the locomotive frame to the tender through the truck frame.

Extending between the wheel pieces 1 is the ash pan structure which is formed integrally with the wheel pieces and comprises a central portion 15 located between the wheels and extending below the axles. The rear wall 16 of the ash pan extends upwardly and outwardly over the rear axle 17 and the front wall 18 of the ash pan is located a substantial distance in front of the front axle 19. Both front and rear walls extend above the level of the wheel pieces 1.

The ash pan side walls include inclined portions 20 extending upwardly and outwardly from the bottom of the ash pan to a level above the tops of the wheel pieces and then outwardly horizontally as indicated at 21 to a point beyond the outer sides of the wheel pieces and each terminates in a vertical flange 22 extending to the level of the mud ring M. At the wheels, the side wall extends vertically as indicated at 23 to meet the inwardly extending horizontal portion 21.

The ash pan proper and wheel piece proper are integrally connected by a longitudinal flange 24 and are suitably braced at intervals by ribs 25.

In the construction shown, the ash pan end walls 16 and 18 and the side wall portions 23 and bottom walls 26 all form transverse members rigidly spacing the wheel pieces 1 and the latter serve as longitudinal beams for the ash pan irrespective of the rigidity afforded the latter by its side wall. A structure of this type eliminates the duplication of strengthening members for the ash pan and frame and makes possible the provision of a lighter truck without any sacrifice of strength or rigidity. As the entire structure is in one-piece, there is also a substantial reduction in cost in the elimination of machine work, fitting, and assembly labor.

In Figures 6 and 7 I illustrate a modified structure showing my invention adapted for a two wheel trailer truck, a portion of the ash pan proper extending downwardly into the space between the axle 26 and the converging wheel pieces 27 which unite to form the forward center plate 33 for connection to the locomotive frame. The side wall of the ash pan will be inclined upwardly and outwardly in front of wheel 28 and will extend upwardly and outwardly abreast of wheel 28 to meet the horizontal portion 29 similar to the corresponding inclined straight portions of the four wheel truck. Like the four wheel truck, the rear end of the truck frame is connected by a cross member 30 which supports the rear end of the fire box and provides a foot plate and draw-bar pockets. The wheel piece 27 is provided with a depending bracket 31 upon which the equalizer 32 is fulcrumed to connect the truck spring system with the locomotive spring system.

In both of the embodiments of my invention illustrated in the accompanying drawings, the wheel pieces are located on the outside of the wheels and are spaced substantially from the major portion of the side walls of the ash pan proper. In my copending application, Serial Number 56,216, filed of even date herewith, I disclose and specifically claim a further modification of my invention in which the wheel pieces are located on the inside of the wheel. Obviously such and other modifications in my invention may be made without departing from the spirit thereof and I contemplate all such modifications as fall within the scope of the appended claims.

I claim:

1. A locomotive truck frame, a portion of which forms an ash pan wall.

2. A locomotive truck frame having an ash pan formed integrally therewith.

3. A one piece casting comprising a locomotive ash pan and truck frame.

4. A locomotive ash pan including wall forming members with depending webs and flanges forming a trailer truck frame.

5. A one piece casting forming a locomotive ash pan with depending webs and flanges forming a trailer truck frame adapted to support the rear end of a locomotive and act as a buffing member for the locomotive.

6. In a one piece truck casting, wheel pieces, and inclined and horizontal members between said wheel pieces serving as transverse elements of the truck frame and as ash pan walls.

7. In a one piece casting, wheel pieces, and inclined and horizontal members extending between said wheel pieces and beyond the same above the wheel clearance line.

8. A one piece locomotive truck frame including wheel pieces and an ash pan extending between said wheel pieces and projecting above the same.

9. A one piece locomotive truck frame including wheel pieces and pedestals and an integral ash pan united with said wheel pieces and pedestals and extending between them and projecting upwardly and outwardly therefrom.

10. A one piece locomotive truck frame including wheel pieces and spring housings with an ash pan formed integrally therewith.

11. A one piece locomotive truck frame including wheel pieces and spring housings and equalizer fulcrums with an ash pan formed integrally therewith.

12. A one piece locomotive truck frame comprising wheel pieces, pedestals, spring housings, equalizer fulcrums and an ash pan all formed integrally.

13. A one piece locomotive truck frame including wheel pieces and an integral ash pan, and draft members located at the ends of said ash pan.

14. A one-piece locomotive truck frame including an integral ash pan with a draw bar pocket located at one end thereof.

15. In a trailer truck, a wheel piece and an inclined ash pan wall formed integrally with said wheel piece and extending outwardly therefrom.

16. In a trailer truck, a wheel piece, and an ash pan having an inclined side wall formed integrally with said wheel piece and extending upwardly and outwardly and downwardly and inwardly from the opposite sides of said wheel piece.

17. In a truck frame, a vertical wall, a wall spaced from and paralleling said vertical wall for a portion of its length, providing room for a truck wheel between said walls, and inclined across said first mentioned wall for a portion of its length, to brace said first mentioned wall.

18. In a truck frame, a vertical wall, a horizontal shelf extending outwardly from the upper portion of said wall and forming an ash pan wall, a second wall spaced from said vertical wall and paralleling the same for a portion of its length, to provide room for a truck wheel between said walls, and inclined across said vertical wall for a portion of its length to brace said shelf at a point outside of said vertical wall.

19. In a locomotive truck, wheels, truck frame elements, and an ash pan extending between said wheels and below the tops thereof and then upwardly and over the tops of the wheels, and united with said elements to form a substantial part of the truck frame.

20. In a locomotive truck, wheels, truck frame elements, an ash pan extending between said wheels and below the tops thereof and then upwardly and over the tops of said wheels and downwardly extending elements integral with said frame elements and ash pan and forming pedestals and housings for truck springs.

21. In a locomotive truck, spaced axles, wheels thereon, an ash pan, and integral depending elements on said ash pan forming a wheel piece with spaced pedestals and depressions between said pedestals extending into the plane of said wheels and forming a wall for the ash pan below the tops of said wheels.

22. In a locomotive truck, an axle, a wheel and journal box thereon, an ash pan, and integral depending elements on said ash pan on each side of said wheel, spaced from each other and forming, respectively, an ash pan side wall and a side of a wheel piece.

23. In a locomotive truck, an axle, a wheel and journal box thereon, an ash pan, and a plurality of integral depending elements on said ash pan spaced from each other and forming respectively an ash pan side wall and the spaced sides of a truck wheel piece spaced from the said ash pan side wall.

24. In a trailer truck frame, side members converging forwardly to form a center plate for pivotal connection to a locomotive frame, and converging rearwardly to form a buffer casting and fire box support, and an ash pan formed integrally with said members between their converging portions.

25. A four wheel trailer truck frame having an ash pan formed integrally therewith and extending over and between all four wheels.

26. A four wheel radial trailer truck frame having a center plate at its forward end and having fire box supporting bearings at its rear end, and an ash pan formed integrally with said frame between said center plate and said bearings.

In testimony whereof I hereunto affix my signature this 9th day of September, 1925.

H. M. PFLAGER.